(12) United States Patent
Gustafson et al.

(10) Patent No.: US 6,791,788 B2
(45) Date of Patent: Sep. 14, 2004

(54) SEGMENTED POWER STRIP FOR AN AUTOMATED ROBOTIC DEVICE AND METHOD FOR JOINING SAME

(75) Inventors: Gary Gustafson, Westminster, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 385 days.

(21) Appl. No.: 10/034,904

(22) Filed: Dec. 27, 2001

(65) Prior Publication Data

US 2003/0002203 A1 Jan. 2, 2003

Related U.S. Application Data

(60) Provisional application No. 60/302,248, filed on Jun. 29, 2001.

(51) Int. Cl.[7] .................. G11B 15/68; G11B 17/22; H01R 25/00
(52) U.S. Cl. ............... 360/92; 369/30.45; 439/122
(58) Field of Search ................... 360/98.04, 98.06, 360/92; 414/276, 277, 331, 249, 279; 191/6, 13, 14, 15; 439/1, 9, 32, 121, 122; 369/30.39, 30.45, 30.57, 30.7, 30.72, 30.85, 30.87

(56) References Cited

U.S. PATENT DOCUMENTS

| | | | |
|---|---|---|---|
| 3,179,063 A | * | 4/1965 | Case et al. ............. 104/295 |
| 3,392,244 A | | 7/1968 | Hillmann |
| 3,729,133 A | * | 4/1973 | Covert .................. 238/10 E |
| 3,733,446 A | | 5/1973 | Colovas et al. |
| 3,881,053 A | | 4/1975 | Lemelson |
| 3,970,775 A | | 7/1976 | Lemelson |
| 4,087,839 A | | 5/1978 | Lemelson |
| 4,928,245 A | | 5/1990 | Moy et al. |
| 4,945,429 A | | 7/1990 | Munro et al. |
| 5,045,646 A | | 9/1991 | Musachio |
| 5,297,484 A | | 3/1994 | Piserchia et al. |
| 5,333,982 A | | 8/1994 | Tanizawa et al. |
| 5,429,470 A | | 7/1995 | Nicol et al. |
| 5,503,260 A | | 4/1996 | Riley |
| 5,544,146 A | | 8/1996 | Luffel et al. |
| 5,608,275 A | | 3/1997 | Khosrowpour |
| 5,646,917 A | * | 7/1997 | Miyoshi et al. .......... 369/30.34 |
| 5,690,197 A | | 11/1997 | Suganuma et al. |
| 5,700,125 A | | 12/1997 | Falace et al. |
| 5,867,003 A | | 2/1999 | Hashimoto et al. |

(List continued on next page.)

FOREIGN PATENT DOCUMENTS

| | | |
|---|---|---|
| DE | 4028059 | 3/1999 |
| EP | 0 288 165 A2 | 10/1988 |
| EP | 0 289 986 A2 | 11/1988 |
| EP | 0 982 724 A2 | 3/2000 |
| EP | 0 989 550 A1 | 3/2000 |
| EP | 1 056 086 A2 | 11/2000 |
| WO | WO 85/02051 | 5/1985 |

OTHER PUBLICATIONS

"L180 Tape Library, General Information Manual," © 1999 Storage Technology Corp., Louisville, CO.

*Primary Examiner*—David Ometz
(74) *Attorney, Agent, or Firm*—Brooks Kushman PC

(57) ABSTRACT

A segmented power strip for supplying electrical power to a robotic device for use in a data storage system, the robotic device adapted to move along a guide rail. The power strip includes first and second substantially planar members each having an end and a conductor for making electrical contact with the robotic device. The first and second members are assembled to create a joint where the conductor of the first member is proximate the conductor of the second member such that the robotic device maintains electrical contact with at least one conductor as the robotic device traverses the joint. The ends of the first and second members are adapted to cooperate such that at least one of the first and second members moves laterally relative to the other during assembly thereof. At least one of the first and second members is biased against lateral motion relative to other.

28 Claims, 13 Drawing Sheets

U.S. PATENT DOCUMENTS

| | | |
|---|---|---|
| 5,870,245 A | 2/1999 | Kersey et al. |
| 5,914,919 A | 6/1999 | Fosler et al. |
| 5,917,253 A | 6/1999 | Rusnack |
| 5,927,464 A | 7/1999 | Clark et al. |
| 5,936,318 A | 8/1999 | Weiler |
| 5,936,796 A | 8/1999 | Haneda |
| 5,993,222 A | 11/1999 | Nicolette et al. |
| 6,011,669 A | 1/2000 | Apple et al. |
| 6,025,972 A | 2/2000 | Schmidtke et al. |
| 6,059,509 A | 5/2000 | Ostwald |
| 6,068,436 A | 5/2000 | Black et al. |
| 6,109,568 A | 8/2000 | Gilber et al. |
| 6,144,391 A | 11/2000 | Hinson et al. |
| 6,153,999 A | 11/2000 | Borrego |
| 6,175,539 B1 | 1/2001 | Holmquist et al. |
| 6,222,699 B1 | 4/2001 | Luffel et al. |
| 6,230,861 B1 | 5/2001 | Cornic |
| 6,231,291 B1 | 5/2001 | Mueller et al. |
| 6,250,442 B1 | 6/2001 | Perraud et al. |
| 6,259,580 B1 | 7/2001 | Schmidtke et al. |
| 6,262,863 B1 | 7/2001 | Ostwald et al. |
| 6,264,017 B1 | 7/2001 | Evans |
| 6,304,798 B1 | 10/2001 | Carpenter |
| 6,327,519 B1 | 12/2001 | Ostwald et al. |
| 6,360,860 B1 | 3/2002 | van Zijverden et al. |
| 6,381,517 B1 | 4/2002 | Butka et al. |
| 6,396,391 B1 | 5/2002 | Binder |
| 6,404,585 B2 | 6/2002 | Schmidtke et al. |
| 6,441,991 B2 | 8/2002 | Ostwald et al. |
| 6,457,928 B1 | 10/2002 | Ryan |
| 6,480,759 B1 | 11/2002 | Ostwald et al. |
| 6,488,462 B1 | 12/2002 | Williams |
| 6,490,122 B1 | 12/2002 | Holmquist et al. |
| 6,510,020 B1 | 1/2003 | Holmquist et al. |
| 2003/0002202 A1 | 1/2003 | Smith et al. |

* cited by examiner

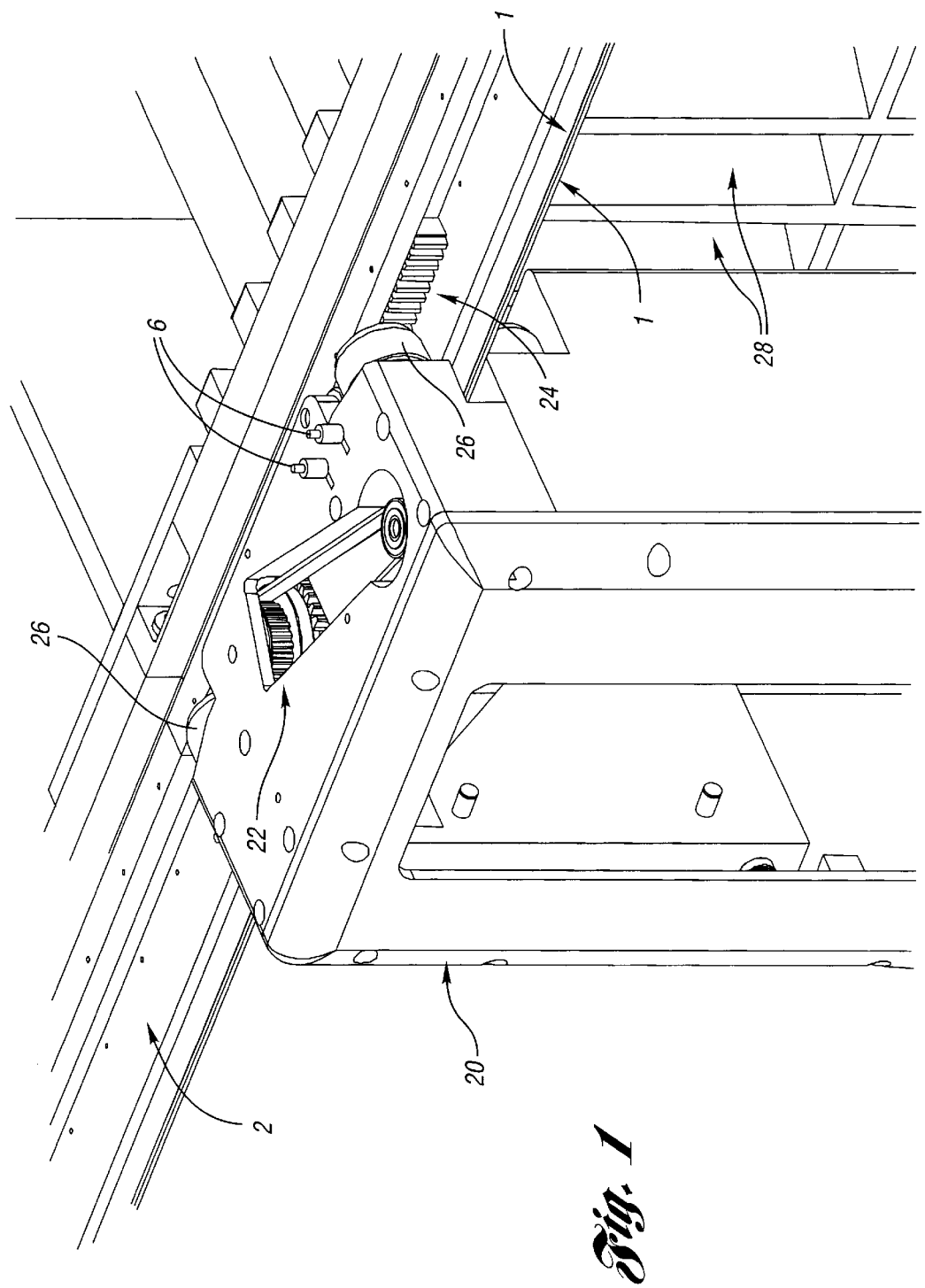

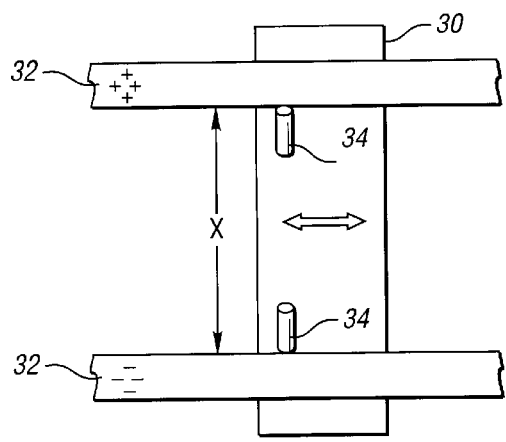
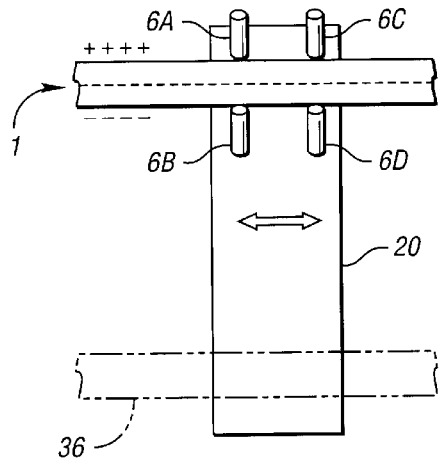
Fig. 3a
*(PRIOR ART)*
Fig. 3b
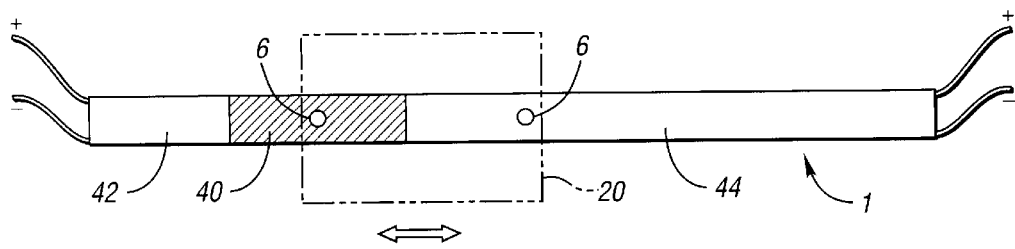
Fig. 4a
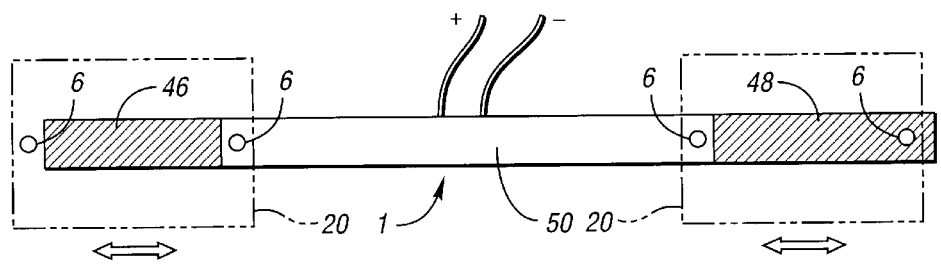
Fig. 4b

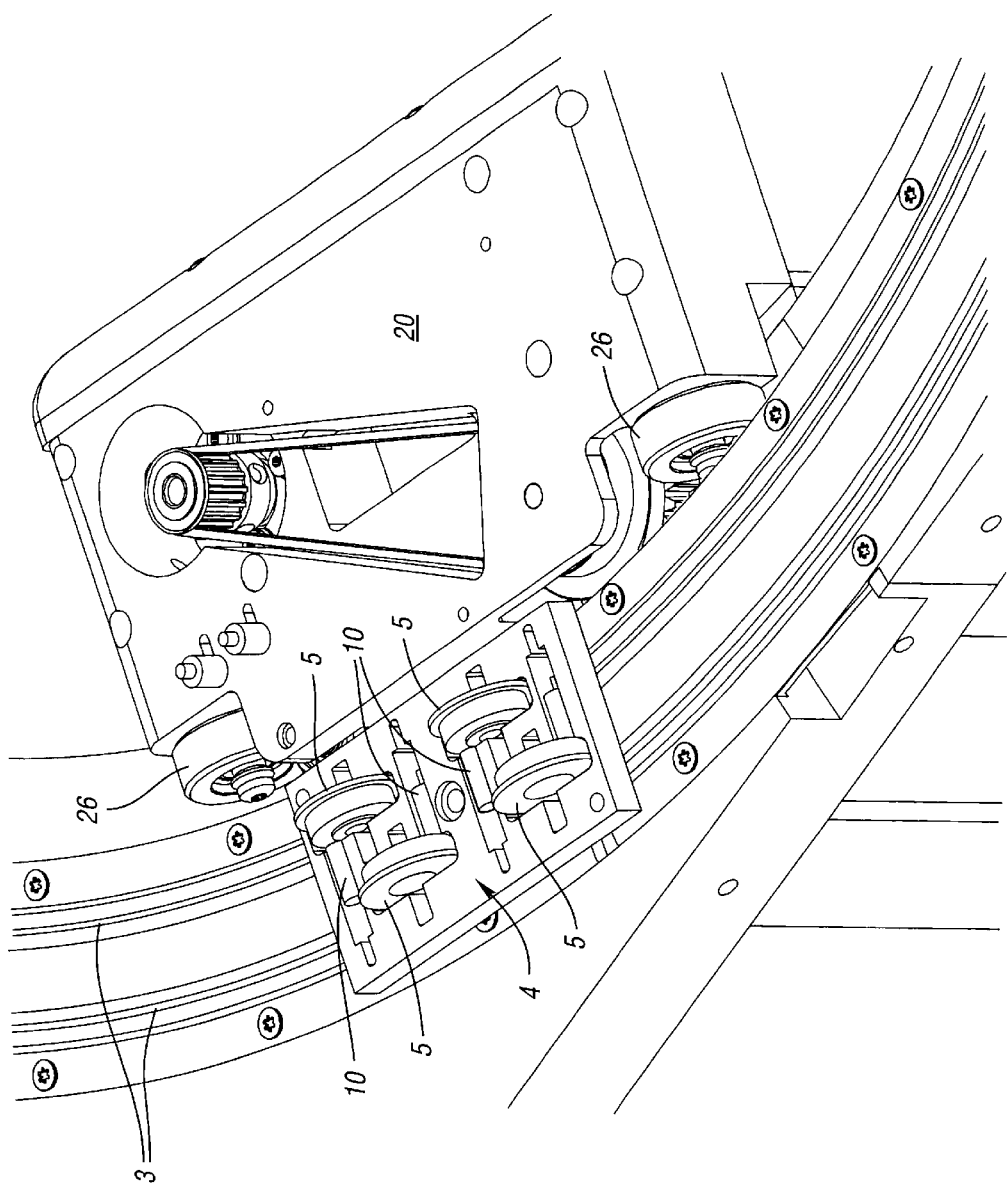

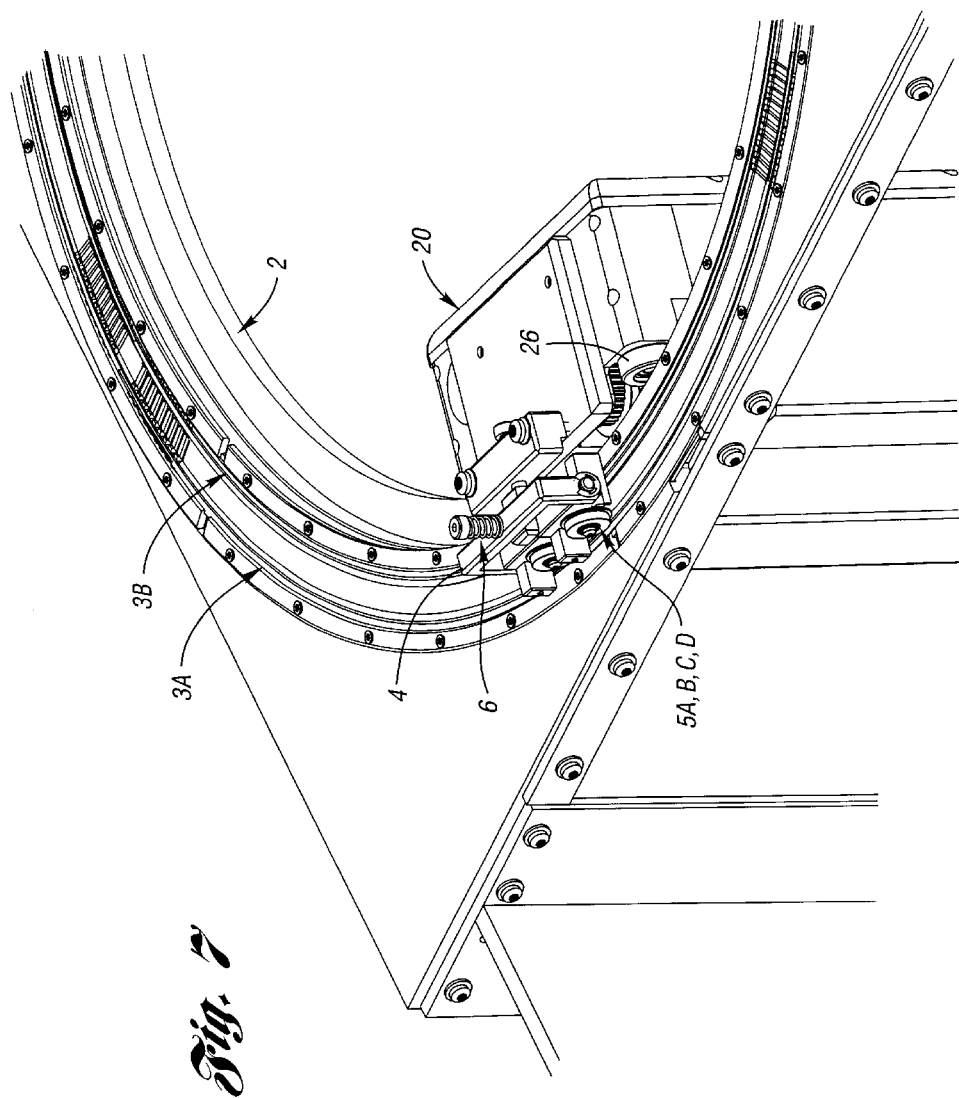

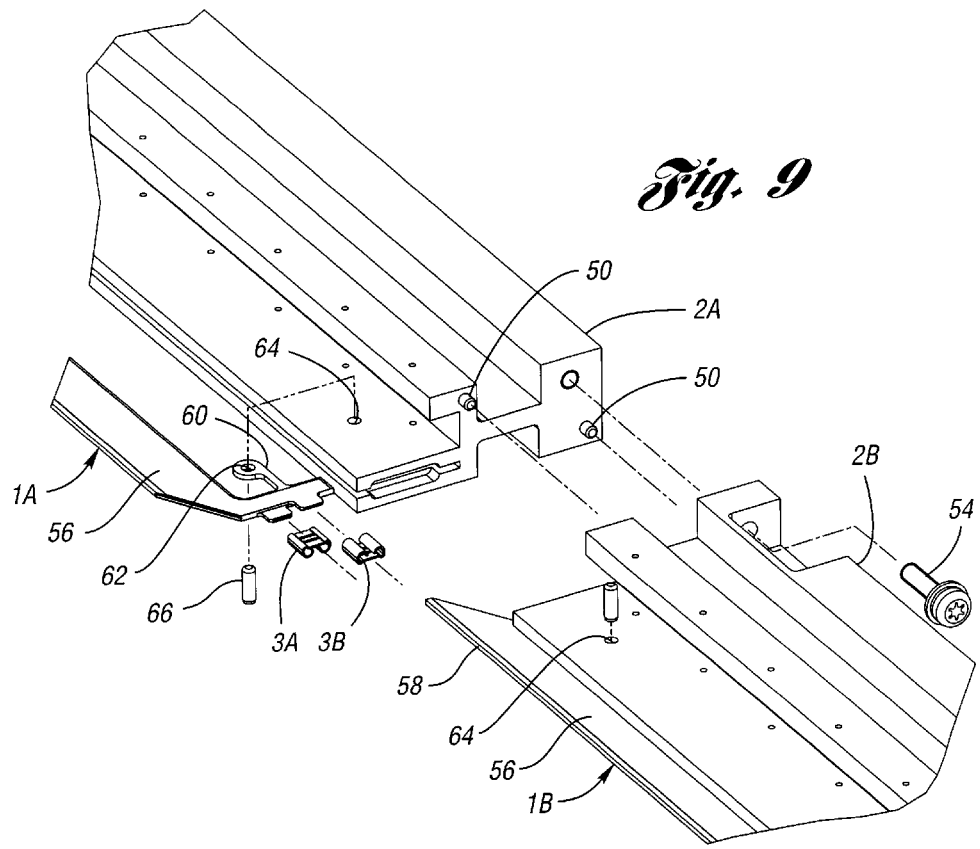
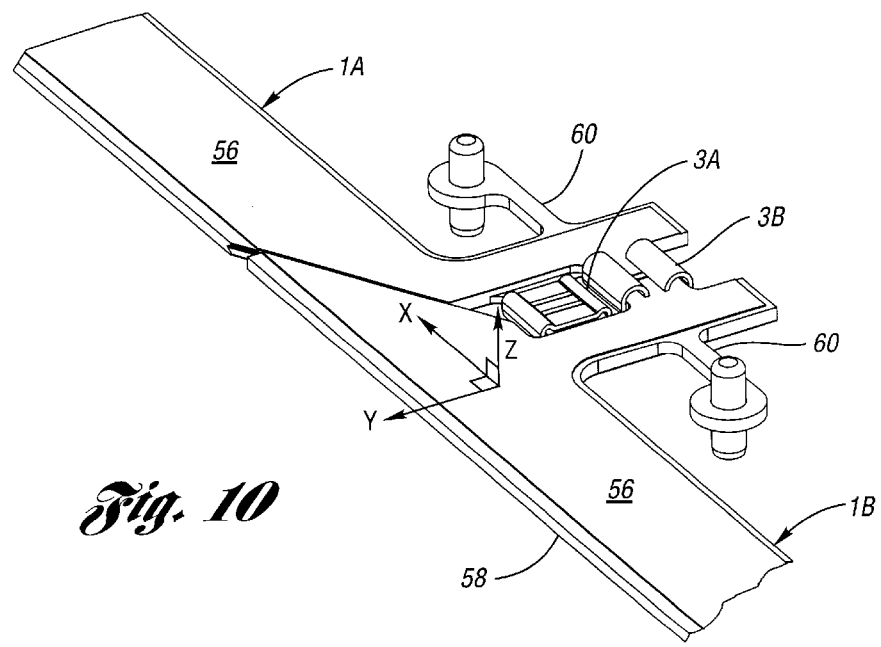

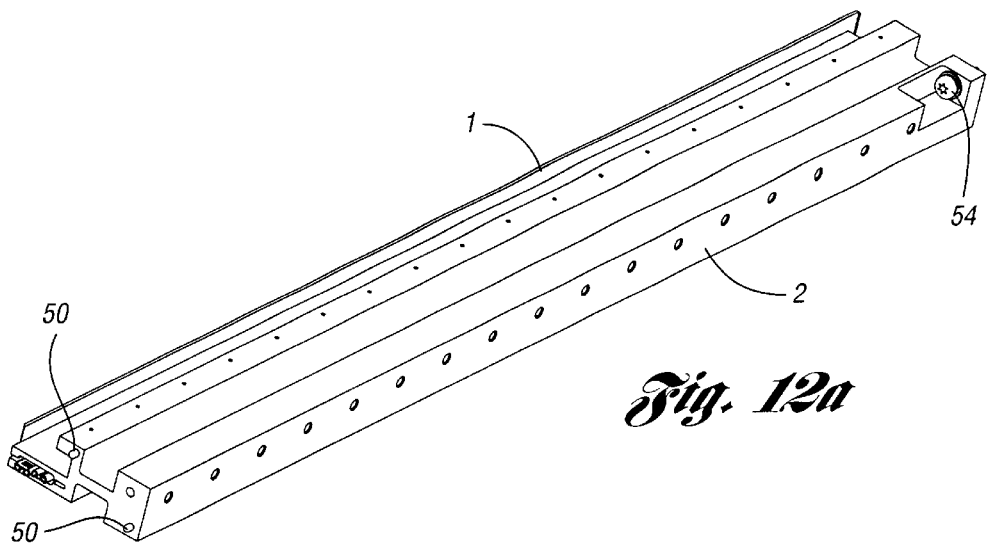
Fig. 12a
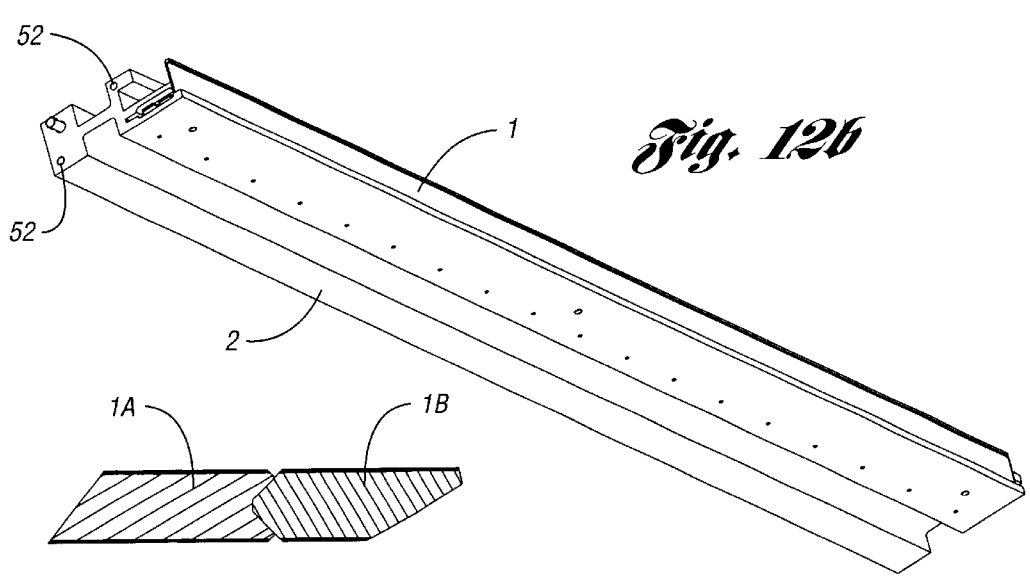
Fig. 12b
Fig. 12c
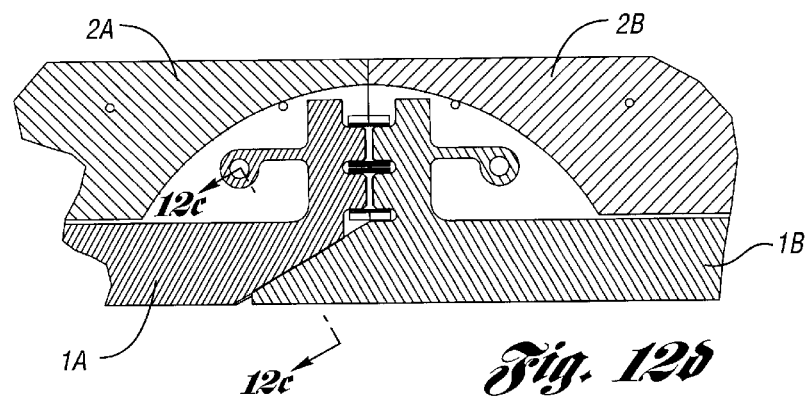
Fig. 12b

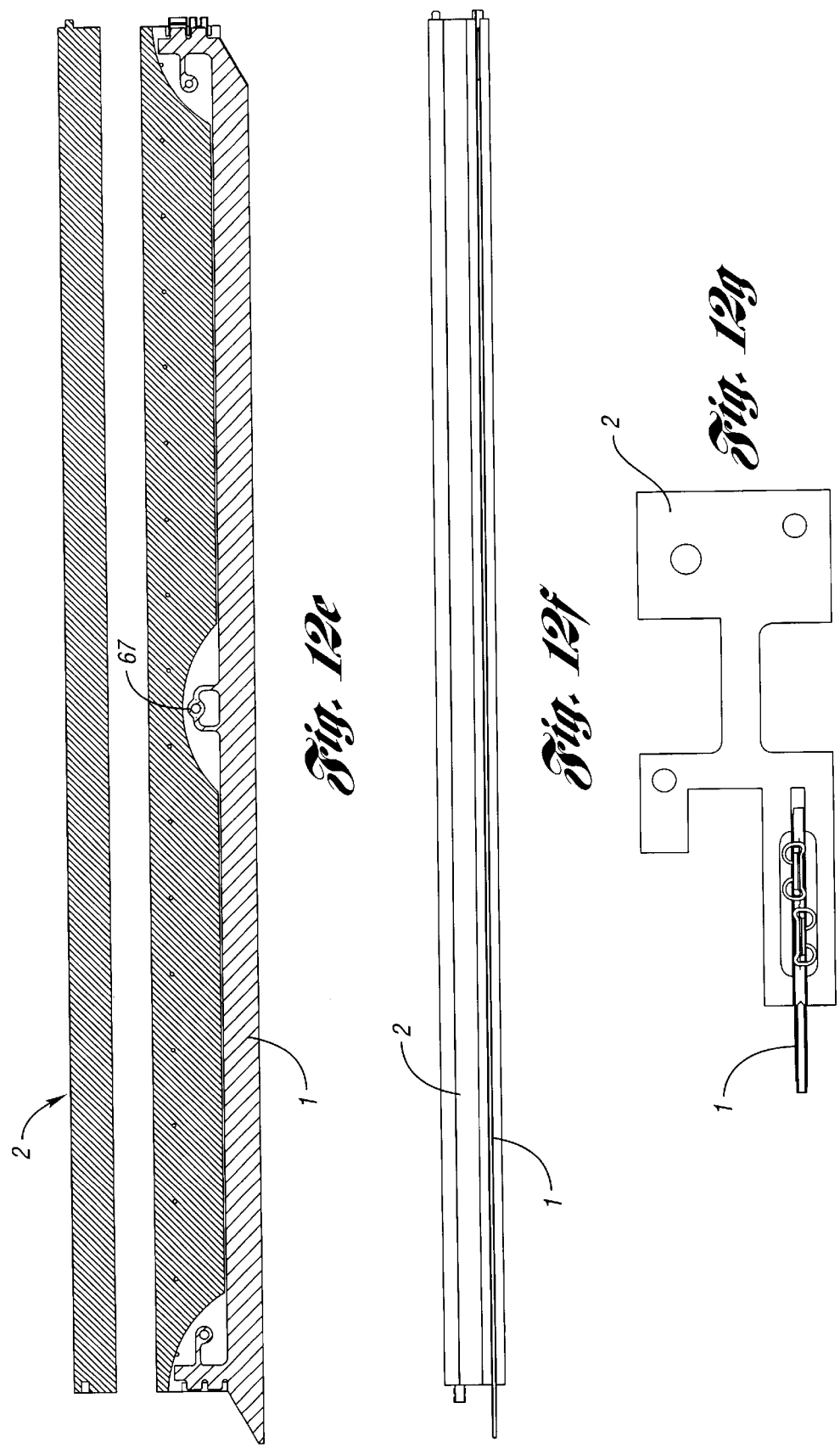

SEGMENTED POWER STRIP FOR AN AUTOMATED ROBOTIC DEVICE AND METHOD FOR JOINING SAME

CROSS-REFERENCE TO RELATED APPLICATIONS

This application claims the benefit of U.S. provisional application Serial No. 60/302,248 filed Jun. 29, 2001.

BACKGROUND OF THE INVENTION

1. Field of the Invention

The present invention relates generally to the distribution of power in a data storage system and, more particularly, to a segmented power strip for distributing power to an automated robotic device for use in a tape cartridge library system.

2. Background

Current automated libraries for tape cartridges typically include arrays of multiple storage cells housing the tape cartridges, as well as multiple media drives. Multiple automated robotic devices may be used to move tape cartridges between the various storage cells and media drives within a library.

As described in detail below, the use of multiple robotic devices in automated tape cartridge libraries raises various problems concerning the distribution of power to such robotic devices. More particularly, robotic devices used in automated tape cartridge libraries require power for operation thereof. In prior art automated tape cartridge libraries, the movement of the robotic devices is restricted by wire cable connections used for providing such power. That is, such cabling can prevent the robotic devices from crossing paths, or from continuous movement in one direction around the library without the necessity of ultimately reversing direction.

Such problems can be overcome through the use of brush/wiper technology. A robotic device traveling over a given route may use power distributors such as fixed conductive strips to supply power to the robotic device, which itself is provided with brushes or wipers that contact the conductive strips in order to conduct power to the robotic device. Multiple brushes are preferably used on each robotic device to improve robustness and reliability. The integration of such conductive strips into the automated tape cartridge library, in conjunction with brush contacts provided on the robotic devices, allows for greater freedom of movement of the robotic devices, as well as for modular and extensible power distribution to robotic devices as library configurations change, or as libraries are connected in a modular fashion to form library systems.

In that regard, such conductive strips may be provided in sections. That is, segmented power conductors or strips may be used to supply electrical power to such robotic devices. Such power strips are joined together along a path or guide rail on which a robotic device moves in the library. When used in such a fashion for power transmission, segmented power strips will be sensitive to alignment so as not to create a sloppy joint. A mis-aligned joint in the power strip may cause a brush to lose contact with a power strip due to bounce. Wear on the brushes and power strip pieces at the joints may also cause limited life of the joint.

As a result, there exists a need for an improved segmented power strip and a method for joining such power strips. Such an improvement would preferably include a pre-loaded and overconstrained joint which would cause the power strips in the robot guide rail to substantially align. Such an improvement would preferably include conductors slightly longer than the supporting structure of the robot guide rail, so as to force adjoining conductors into contact at their ends as guide rails and conductors are assembled. In addition, adjoining ends of conductors would preferably be beveled or angled such that a force urging the conductors together causes the conductors to slip laterally against each other, so as to again facilitating alignment at the joint. Such a bevel or angle would also spread out the wiping action of a brush as it traverses the joint, thereby prolonging the life of the joint and brush, and limiting any problems that may arise as a result of any small offset. Still further, the power strips would preferably be pre-loaded or biased by a spring load, thereby causing the joint to stay in compression for the life of the joint.

SUMMARY OF THE INVENTION

Accordingly, the present invention provides for improved power distribution to an automated robotic device in a data storage library using a segmented power strip.

According to the present invention, then, a segmented power strip is provided for supplying electrical power to an automated robotic device for use in a data storage system having a guide rail, wherein the automated robotic device is adapted to move along the guide rail. The segmented power strip comprises a first substantially planar member having an end, the first member comprising a conductor for making electrical contact with the automated robotic device, and a second substantially planar member having an end, the second member comprising a conductor for making electrical contact with the automated robotic device. The first and second members are assembled to create a joint where the conductor of the first member is proximate the conductor of the second member such that the automated robotic device maintains electrical contact with at least one conductor as the automated robotic device traverses the joint, and the ends of the first and second members are adapted to cooperate such that at least one of the first and second members moves laterally relative to the other of the first and second members during assembly thereof. The power strip further comprises means for biasing at least one of the first and second members against lateral motion relative to other of the first and second members.

Also according to the present invention, a method is provided for joining a segmented power strip for supplying electrical power to an automated robotic device for use in a data storage system having a guide rail, wherein the automated robotic device is adapted to move along the guide rail. The method comprises providing a first substantially planar member having an end, the first member comprising a conductor for making electrical contact with the automated robotic device, and providing a second substantially planar member having an end, the second member comprising a conductor for making electrical contact with the automated robotic device. The first and second members are assembled to create a joint where the conductor of the first member is proximate the conductor of the second member such that the automated robotic device maintains electrical contact with at least one conductor as the automated robotic device traverses the joint, and the ends of the first and second members are adapted to cooperate such that the at least one of the first and second members moves laterally relative to the other of the first and second members during assembly thereof. The method further comprises providing means for biasing at least one of the first and second members against lateral motion relative to other of the first and second members.

According to another embodiment of the present invention, a segmented power strip is provided for supplying electrical power to an automated robotic device for use in a data storage system having a guide rail, wherein the automated robotic device is adapted to move along the guide rail. The segmented power strip comprises a first substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip. The power strip further comprises a second substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip. The first and second members are assembled to create a joint where the first and second conductive strips of the first member are proximate the first and second conductive strips of the second member, respectively, such that the automated robotic device maintains electrical contact with at least one first conductive strip and at least one second conductive strip as the automated robotic device traverses the joint, and the ends of the first and second members are adapted to cooperate such that at least one of the first and second members moves laterally relative to the other of the first and second members during assembly thereof. The power strip still further comprises means for biasing at least one of the first and second members against lateral motion relative to the other of the first and second members.

Still further according to another embodiment of the present invention, a method is provided for joining a segmented power strip for supplying electrical power to an automated robotic device for use in a data storage system having a guide rail, wherein the automated robotic device is adapted to move along the guide rail. The method comprises providing a first substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip. The method also comprises providing a second substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip. The first and second members are assembled to create a joint where the first and second conductive strips of the first member are proximate the first and second conductive strips of the second member, respectively, such that the automated robotic device maintains electrical contact with at least one first conductive strip and at least one second conductive strip as the automated robotic device traverses the joint, and the ends of the first and second members are adapted to cooperate such that at least one of the first and second members moves laterally relative to the other of the first and second members during assembly thereof. The method further comprises providing means for biasing at least one of the first and second members against lateral motion relative to the other of the first and second members.

The above features, and other features and advantages of the present invention are readily apparent from the following detailed descriptions thereof when taken in connection with the accompanying drawings.

BRIEF DESCRIPTION OF THE DRAWINGS

FIG. 1 is a perspective view of a robotic device for use in an automated tape cartridge library having brush and strip power distribution according to the present invention;

FIG. 3a is a simplified block diagram of a robotic device for use in an automated tape cartridge library according to the prior art;

FIG. 3b is a simplified a block diagram of a robotic device for use in an automated tape cartridge library having brush and strip power distribution according to the present invention;

FIGS. 4a and 4b are simplified overhead block diagrams of a power strip and robotic device with conductive brushes for use in an automated tape cartridge libraries according to the present invention;

FIG. 6 a more detailed perspective view of a robotic device for use in an automated tape cartridge library having brush and wheel power distribution;

FIG. 7 is another more detailed perspective view of a robotic device for use in an automated tape cartridge library having brush and wheel power distribution;

FIG. 9 is an exploded perspective view of power strip and guide rail joint for use in an automated tape cartridge library according to the present invention;

FIG. 10 is a perspective view of a power strip joint for use in an automated tape cartridge library according to the present invention;

FIGS. 12a and 12b are perspective views of a guide rail sections for use in an automated tape cartridge library having brush and strip power distribution according to the present invention;

FIGS. 12c–g are cross-sectional and side views of a power strip and guide rail assembly for use in an automated tape cartridge library according to the present invention;

DETAILED DESCRIPTION OF THE PREFERRED EMBODIMENT(S)

Figure 2A:
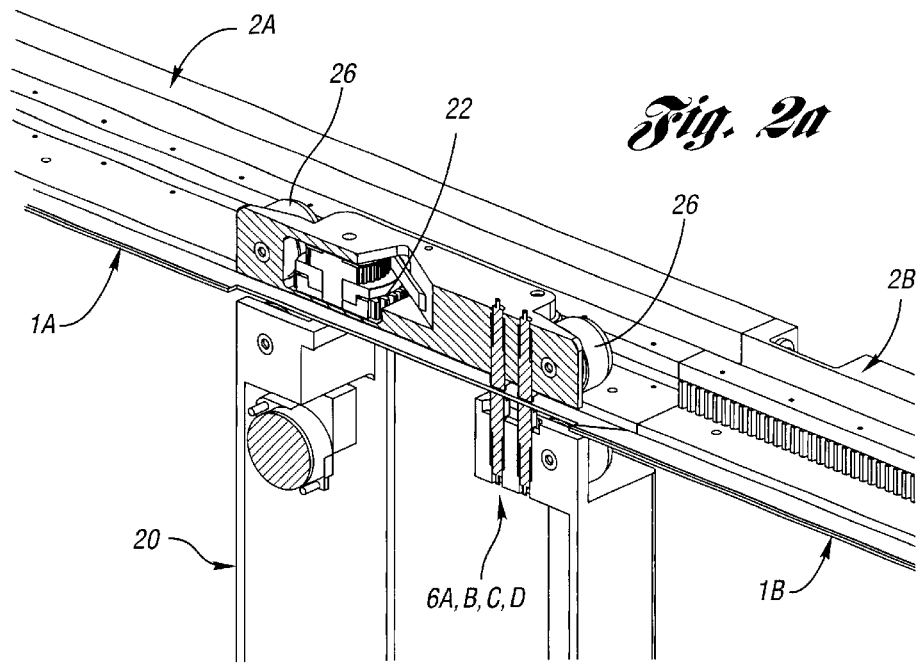
FIGS. 2a and 2b are partial cross-sectional views of a robotic device for use in an automated tape cartridge library having brush and strip power distribution according to the present invention.

With reference to the Figures, the preferred embodiments of the present invention will now be described in greater detail. The present application incorporates by reference herein commonly owned U.S. patent application Ser. Nos. 10/033,867, 10/034,972, 10/033,944, 10/033,942, and 10/034,584, all filed on the same date as the present application.

As previously noted, current automated libraries for tape cartridges typically include arrays of multiple storage cells housing the tape cartridges, as well as multiple media drives. Multiple automated robotic devices may be used to move tape cartridges between the various storage cells and media drives within a library.

As also noted previously, the use of multiple robotic devices in automated tape cartridge libraries raises various problems concerning the distribution of power to such robotic devices. In that regard, segmented power conductors or strips may be used to supply electrical power to such robotic devices. Such power strips are joined together along a path or guide rail on which a robotic device moves in the library. The robotic device may include brushes or wheels for contacting the power strips as the robotic device moves.

When used in such a fashion for power transmission, segmented power strips will be sensitive to alignment so as not to create a sloppy joint. A mis-aligned joint in the power strip may cause a brush to lose contact with a power strip due to bounce. Wear on the brushes and power strip pieces at the joints may also cause limited life of the joint.

As a result, there exists a need for an improved segmented power strip and a method for joining such power strips. Such an improvement would preferably include a pre-loaded and overconstrained joint which would cause the power strips in the robot guide rail to substantially align. Such an improvement would preferably include conductors slightly longer than the supporting structure of the robot guide rail, so as to force adjoining conductors into contact at their ends as guide rails and conductors are assembled. In addition, adjoining ends of conductors would preferably be beveled or angled such that a force urging the conductors together causes the conductors to slip laterally against each other, so as to again facilitating alignment at the joint. Such a bevel or angle would also spread out the wiping action of a brush as it traverses the joint, thereby prolonging the life of the joint and brush, and limiting any problems that may arise as a result of any small offset. Still further, the power strips would preferably be pre-loaded or biased by a spring load, thereby causing the joint to stay in compression for the life of the joint.

More particularly, robotic devices used in automated tape cartridge libraries require power for operation thereof. In prior art automated tape cartridge libraries, the movement of the robotic devices is restricted by wire cable connections used for providing such power. That is, such cabling can prevent the robotic devices from crossing paths, or from continuous movement in one direction around the library without the necessity of ultimately reversing direction.

Such problems can be overcome through the use of brush/wiper technology. A robotic device traveling over a given route may use power distributors such as fixed conductive strips of material to supply power to the robotic device, which itself is provided with brushes or wipers that contact the conductive strips in order to conduct power to the robotic device. Multiple brush or wiper pairs are preferably used on each robotic device to improve robustness and reliability. The integration of such conductive strips, which also may be referred to as power strips, into the automated tape cartridge library, in conjunction with brush or wiper contacts provided on the robotic devices, allows for greater freedom of movement of the robotic devices, as well as for modular and extensible power distribution to robotic devices as library configurations change, or as libraries are connected in a modular fashion to form library systems.

Figure 2B:
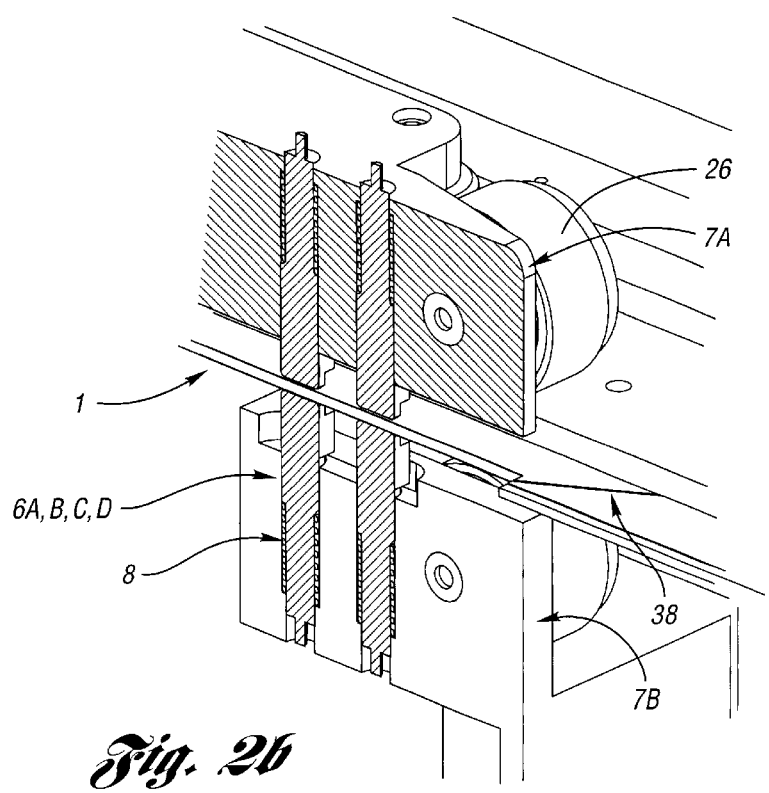

FIGS. 1 and 2a–b show perspective and cross-sectional views, respectively, of a robotic device for use in an automated tape cartridge library having brush and strip power distribution according to the present invention. As seen therein, a moveable robotic device (20), which may be referred to as a "handbot" or "picker," is supported by a guide structure or rail (2) having an integrated power strip (1). Guide rail (2) and/or power strip (1) may also be referred to as a track. Power strip (1) comprises back-to-back conductive surfaces (1A, 1B), preferably copper, separated by a dielectric (preferably FR4) in a sandwich-like configuration. As described in greater detail below, such a configuration provides for improved impedance control. Power strip (1) may be a printed circuit board wherein copper conductors are laminated, glued or etched onto a substrate material. Alternatively, power strip (1) may comprise copper foil tape glued or laminated onto plastic material, or copper inserts molded into a moldable plastic material. Any other methods of construction or configurations known to those of ordinary skill may also be used.

Robotic device (20) includes brush contacts (6) for providing power to robotic device (20). In that regard, the back-to-back conductive surfaces (1A, 1B) of power strip (1) are oppositely charged. An upper brush (6A) in contact with one conductive surface (1A), in conjunction with a corresponding lower brush (6B) in contact with the opposite conductive surface (1B) thereby supply power to the robotic device (20). Brushes (6) are contained in housing assembly (7) and, to ensure that contact between brushes (6) and power strip (1) is maintained, brushes (6) are spring loaded (8). Multiple or redundant pairs of such upper and lower brushes (6) are preferably provided, and preferably spring loaded (8) independently, to improve robustness and reliability in the event of a brush failure, momentary loss of contact at one or more brushes due to any track irregularities, including seams or joints therein, or voltage irregularities between adjacent power strips (1). Moreover, brushes (6) preferably have a circular cross-section, such as is provided by a cylindrical shaped brush (6), as these are better able to traverse a joint or seam (38) in the power strip (1), which may more readily impede or catch a square shaped brush.

Power supplied to robotic device (20) through power strip (1) and brushes (6) powers a motor (not shown) in robotic device (20), which in turn drives a belt and gear system (22). Guide rails (2) includes teeth (24) which cooperate with belt and gear system (22) to permit robotic device (20) to move back and forth along guide rails (2) via guide wheels (26). In that regard, it should be noted that power strip (1) preferably provides DC power to robotic device (20). As seen in FIG. 1, robotic device (20) may thereby gain access to tape cartridges stored in library cells (28) located adjacent guide rail (2). It should also be noted that while only a single robotic device (20) is depicted, power strip (1) is preferably suitable, according to any fashion known in the art, to provide power to multiple robotic devices. In that regard, each robotic device (20) is suitably equipped with a circuit breaker (not shown) in any fashion known in the art in order to isolate the robotic device (20) from the power strip (1) in the event that the robotic device short circuits. In such a manner, the failure of the entire power strip (1) is prevented.

Referring now to FIG. 3a, a simplified block diagram of a robotic device for use in an automated tape cartridge library according to the prior art is shown. As seen therein, a prior art robotic device (30) in an automated tape cartridge library has a pair of spaced apart, oppositely charged power rails (32). The robotic device (30) is provided with a pair of brush contacts (34) for supplying power from two power rails (32) to the robotic device (30), in order to allow movement of the robotic device (30). As seen in FIG. 3a, the large distance, x, between a cooperating pair of brushes (34) creates uneven wear on the brushes (34) due to construction tolerances in the robotic device (30) and the track or power rails (32). Brushes (34) also causes uneven drag on the robotic device (30) by creating a moment load resulting from the separation, x, between the brush (34) and power rail (32) friction points.

FIG. 3b is a simplified a block diagram of a robotic device for use in an automated tape cartridge library having brush and strip power distribution according to the present invention. As seen therein, in contrast to the prior art configuration of FIG. 3a, power is supplied to the robotic device (20) through the power strip (1) and brush (6) configuration described in connection with FIGS. 1 and 2a–b, thereby facilitating the elimination of the large separation between a pair of cooperating brushes (6A, 6B), and the accompanying problems, and allowing for lower construction tolerance requirements. The single rail construction, two-sided power strip (1) and brush (6) configuration also acts to reduce costs and provides for a more integrated assembly. As seen in FIG. 3b, an optional, non-powered lower guide rail (36) may also be provided for robotic device (20). It should also be noted that the copper foil tape that may be used in the construction of the power strip (1) may be installed in the field during the assembly of the automated tape cartridge library. In such a fashion, it may be possible to eliminate all electrical joints in power strip (1) by using a continuous copper foil strip.

FIGS. 4a and 4b are simplified overhead block diagrams of a power strip (1) and robotic device (20) with conductive brushes (6) for use in an automated tape cartridge libraries according to the present invention. As seen in FIG. 4a, power strips (1) may be fed power from both ends thereof, or multiple sections of power strips may be fed from both ends. Robotic device (20) is preferably provided with multiple pairs of cooperating brush contacts (6), only the top brushes in each cooperating pair being visible in FIG. 4a. In that regard, with reference again to FIGS. 2a and 2b, it should also be noted that brush pairs on each side of power strip (1) are oriented so as to follow the same path. That is, a pair of brushes (6) contacting the same conductive surface (1A, 1B) are aligned so that both such brushes (6) contact the same part of the conductive surface (1A, 1B) as robotic device (20) moves in the library. Such a brush orientation facilitates the creation of a beneficial oxide layer on the conductive surfaces (1A, 1B). As will be discussed in greater detail below, such an oxide layer helps reduce both electrical and sliding resistance between the brushes and the conductive surfaces (1A, 1B).

Referring still to FIGS. 4a and 4b, cooperating brush pairs are preferably spaced apart on robotic device (20). Such spacing, as well as the use of multiple cooperating brush pairs provides for greater robustness and freedom of movement for robotic device (20) in the event of track irregularities, including unevenness or "dead" track sections. In that regard, as seen in FIG. 4a, a non-powered or "dead" section (40) of power strip (1) will not necessarily prevent robotic device (20) from traversing the full extent of the power strip (1). That is, as the robotic device (20) moves across the dead track section (40), one cooperating pair of brushes always maintains contact with a powered track section (42, 44). Similarly, as seen in FIG. 4b, power strip (1) may be fed power from a more centralized region thereof. As a result of the separation of cooperating pairs of brush contacts, robotic device (20) may be able to traverse longer distances than the length of power strip (1) onto and off of non-powered end-of-track sections (46, 48), provided at least one cooperating pair of brushes maintain contact with powered track section (50). Moreover, in such a fashion, non-powered track sections may be provided where a robotic device (20) may be deliberately driven off power strip (1) and thereby powered down for service.

Figure 4C:
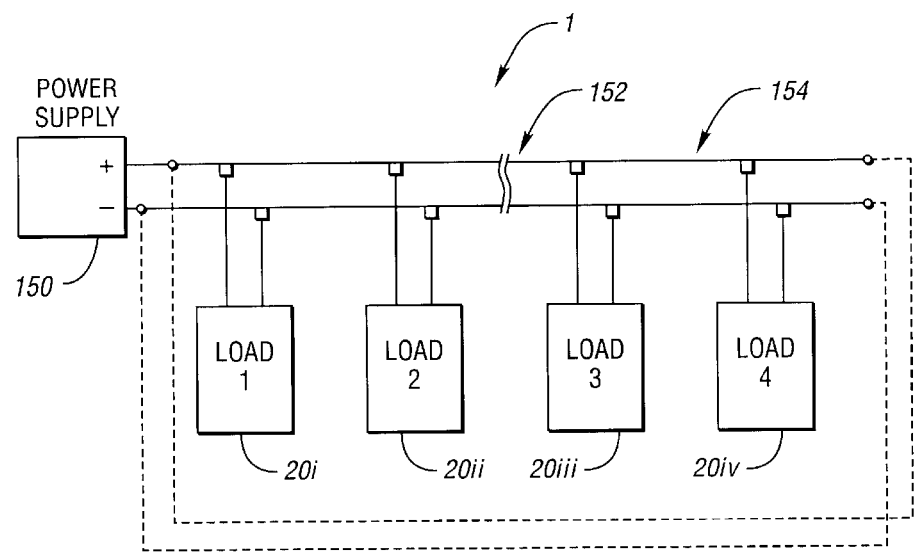
FIGS. 4c and 4d are simplified electrical schematics depicting power supply redundancy schemes according to the present invention.
Figure 4D:
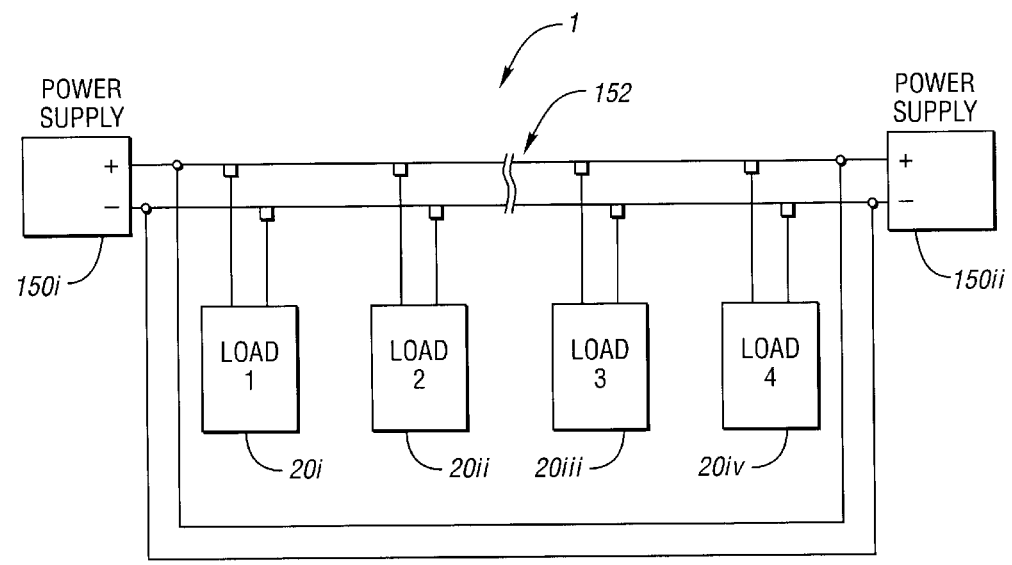
Figure 5:
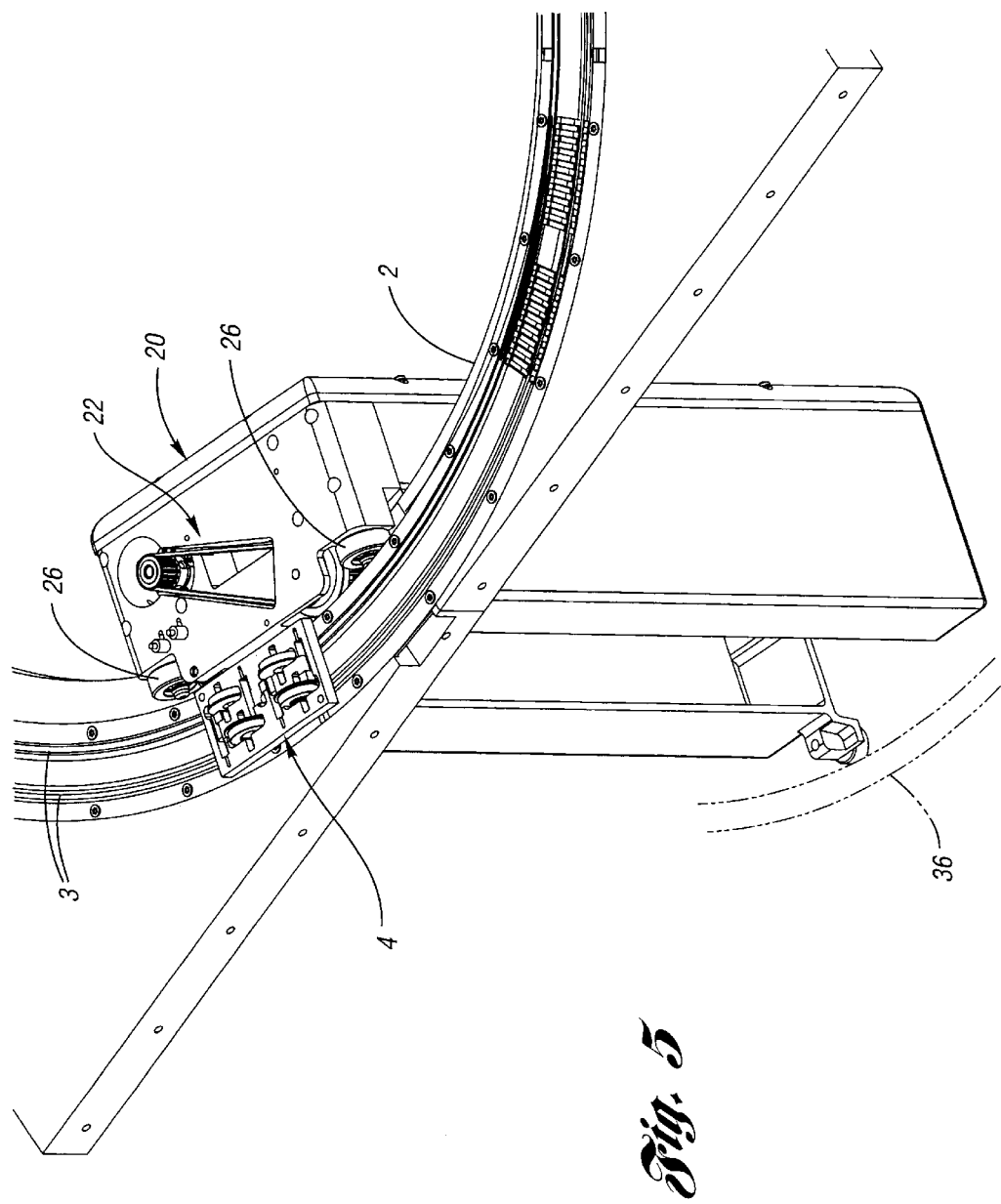
FIG. 5 is a perspective view of a robotic device for use in an automated tape cartridge library having brush and wheel power distribution.
Figure 8A:
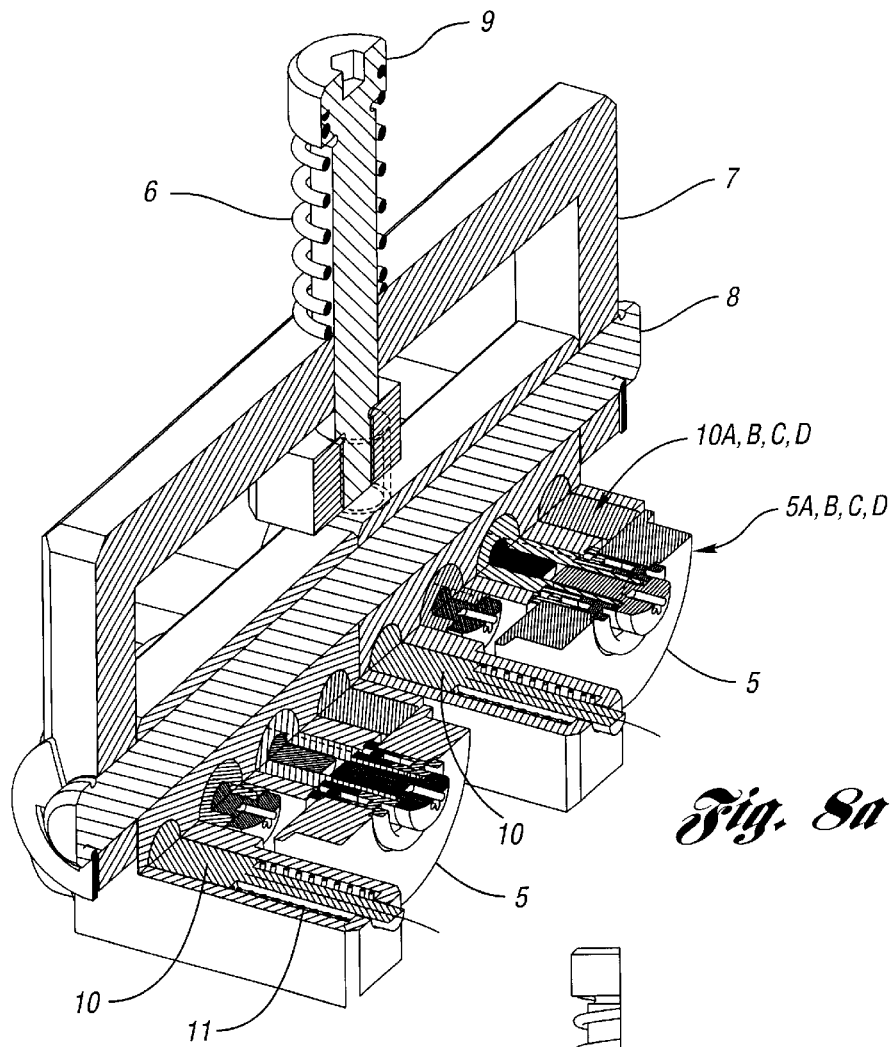
FIGS. 8a and 8b are side and cross-sectional views, respectively, of a brush and wheel mechanism for power distribution to a robotic device in an automated tape cartridge library.
Figure 8B:
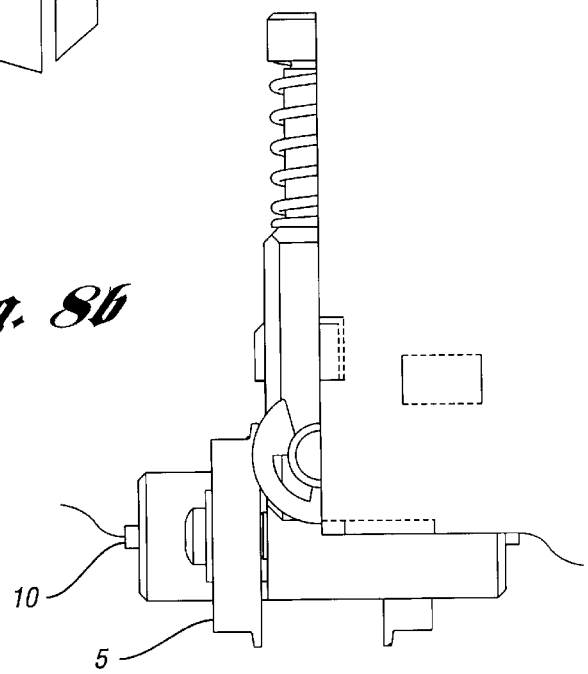
Figure 11A:
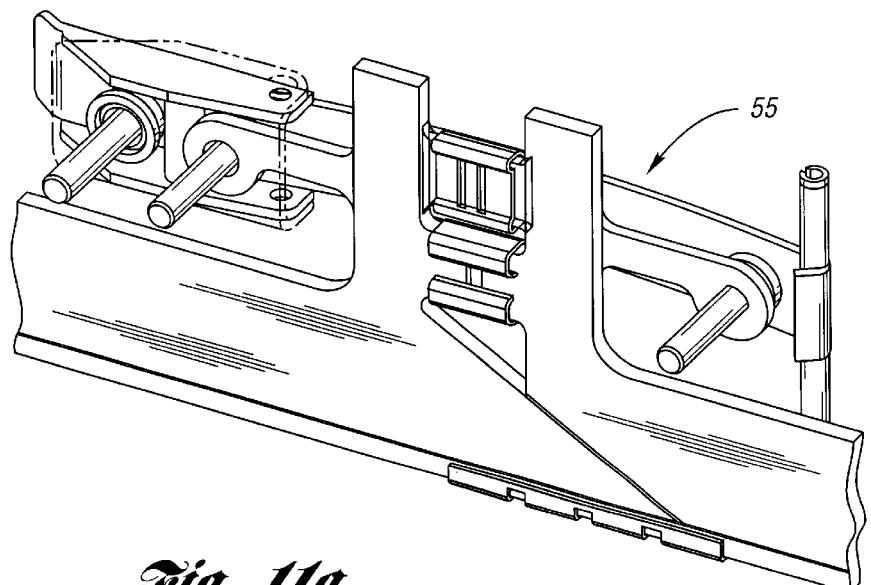
FIGS. 11a and 11b are additional perspective views of a power strip joint for use in an automated tape cartridge library according to the present invention.
Figure 11B:
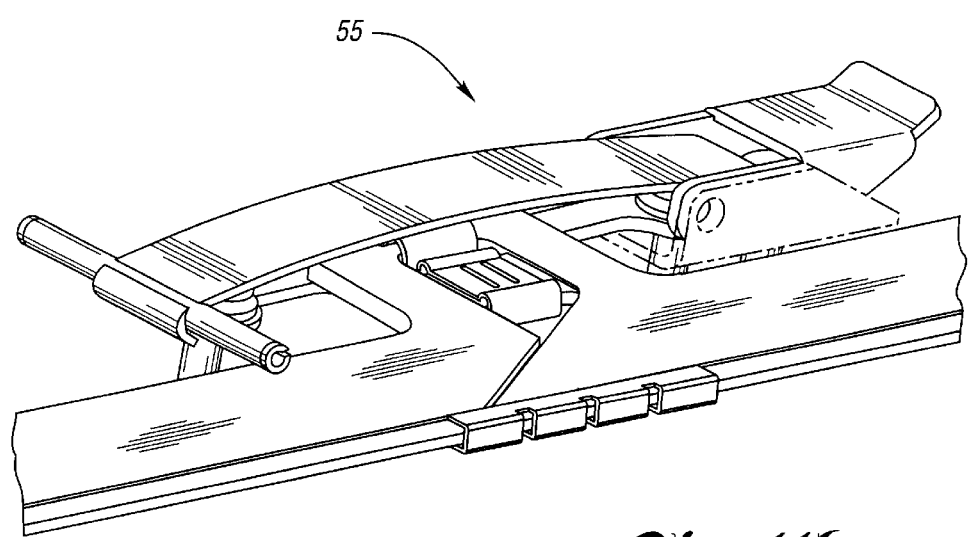

In that same regard, FIGS. 4c and 4d depict simplified electrical schematics of power supply redundancy schemes. As seen in FIG. 4c, in a brush and strip power distribution system, failure of a power supply (150) or a break (152) in the electrical continuity in a power strip (1) will cause a power interruption. Such an electrical discontinuity (152) in turn will result in a loss of power to all of the robotic devices (20i, 20ii, 20iii, 20iv) connected to the conductor. More specifically, such an electrical break (152) will result in the loss of power to those devices (20iii, 20iv) located on the disconnected side (154) of the strip (1). As will be described in greater detail below, a brush a strip power distribution system may be implemented using many interconnected segments or sections to create power strip (1). Each interconnect substantially increases the possibility that power to part or all of the power strip (1) may be interrupted.

The present design substantially improves the reliability of such a power distribution system by ensuring that the failure of a single power supply or an electrical break in power strip (1) will not interrupt operation of the automated robotic library. More specifically, as seen in FIG. 4d, the present invention preferably provides for connecting two power supplies (150i, 150ii), rather than one, to power strip (1). In the preferred embodiment shown in FIG. 4d, the two power supplies (150i, 150ii) are positioned at the two ends of power strip (1), and electrically connected to both ends of power strip (1). The power supplies (150i, 150ii) are preferably of the redundant/load sharing type.

When both supplies (150i, 150ii) are active and functioning normally, they share the load created by robotic devices (20i, 20ii, 20iii, 20iv) nearly equally. In the event, however, that one power supply (e.g., 150i) fails, the remaining power supply (e.g., 150ii) automatically begins to source power to all of the devices (20i, 20ii, 20iii, 20iv) connected to the power strip (1). Moreover, in the event of an electrical discontinuity or break (152) in the power strip (1), each power supply (150i, 150ii) will continue to deliver power to the devices (20i, 20ii, 20iii, 20iv) located on that power supply's (150i, 150ii) respective side of the break (152). Alternatively, as shown in dashed line fashion in FIG. 4c, single power supply (150) may be configured to supply power to both ends of power strip (1), thereby ensuring that a break (152) in power strip (1) will not result in loss of power to any of robotic devices (20i, 20ii, 20iii, 20iv). It should be noted that while shown in FIGS. 4c and 4d as electrically connected at the ends of power strip (1), power supplies (150, 150i, 150ii) may alternatively and/or additionally be electrically connected to any other point or points on power strip (1). That is, in a power strip (1) comprising a plurality of electrically interconnected sections or segments, power supplies (150, 150i, 150ii) may be electrically connected to any number of sections anywhere along power strip (1). It should also be noted that the power supply redundancy schemes depicted in FIGS. 4c and 4d are equally suitable for use in the brush and wheel power distribution system described in detail immediately below.

Referring next to FIGS. 5 through 8a and 8b, various perspective, side and cross-sectional views of a robotic device for use in an automated tape cartridge library having brush and wheel power distribution according to the present invention are shown. As seen therein, in this alternative embodiment, robotic device (20) is supported by a guide rail (2), which is provided with a pair of oppositely charged power conductors (3), preferably in the form of copper rails. Power rails (3) supply power to robotic device (20) through power transmission carriage assembly (4). Power supplied to robotic device (20) via power rails (3) and power transmission carriage (4) powers a motor (not shown), which in turn drives belt and gear mechanism (22) to permit robotic device (20) to move back and forth along guide rail (2) via guide wheels (26). In that regard, it should be noted that power rails (3) may provide either AC or DC power to robotic device (20). It should also be noted again that while only a single robotic device (20) is depicted, power rails (3) are preferably suitable, according to any fashion known in the art, to provide power to multiple robotic devices. As described above in connection with the brush and stip power distribution, each robotic device (20) is suitably equipped with a circuit breaker (not shown) in any fashion known in the art in order to isolate the robotic device (20) from the power rails (3) in the event that the robotic device short circuits. In such a manner, the failure of the power rails (3) is prevented.

Power transmission carriage (4) includes multiple cooperating pairs of conduction wheels (5) (preferably copper), the individual members of a cooperating pair provided in contact, respectively, with oppositely charged conductor rails (3). Conductive brushes (10) are provided to contact conduction wheels (5) and are spring loaded (11), preferably independently, to maintain such contact. To maintain contact between conduction wheels (5) and conductor rails (3), power transmission carriage (4) also includes vertical pre-load spring (6). Power transmission carriage (4) still further includes gimbal arm (7) with pivot shaft (8) and pivot screw (9) for carriage compliance. Once again, multiple or redundant conduction wheel (5) and conductive brush (10) pairs are preferably provided, and preferably spring loaded (11) independently, to improve robustness and reliability in the event of a brush failure, momentary loss of contact at one or more wheels due to any track irregularities, including seams or joints therein, or voltage irregularities between adjacent power rails (3). In that same regard, while a single vertical pre-load spring (6) is shown, each conduction wheel (5) could also be independently spring loaded to maintain contact with conductor rails (3), thereby allowing for better negotiation of any track irregularities or imperfections, including joints or seams.

The brush and wheel embodiment can reduce particulate generation which may accompany the brush and power strip embodiment. Moreover, because of the more contained nature of the contact between a brush and wheel as opposed to between a brush and extended power stip, any such particulate generation can be more easily contained in the brush and wheel embodiment, such as through the use of a container (not shown) surrounding the brush and wheel to capture any particulate. The brush and wheel embodiment also provides for improved negotiation of joints by a robotic device, such that less strict tolerances are required for joint design and assembly. Moreover, a brush passing over an irregularity in a power strip, such as a joint, scrapes both the brush and the track, causing wear to both. A wheel can more easily negotiate such irregularities, thereby reducing such wear.

The brush and wheel embodiment also provides for reduced electrical and sliding resistance. In that regard, a beneficial oxide layer that reduces both electrical and sliding resistance develops more easily and quickly between a brush and wheel contact than between a brush and extended power strip contact, again because of the more contained nature of the contact. That is, for a given linear movement of a robotic device, a brush covers much more of the surface, and much of the same surface of a wheel than it covers on an extended linear conductive strip.

The brush and wheel embodiment also generally reduces the spring loading forces required. In that regard, because of irregularities in a conductive strip, such as due to joints or seams, a high spring loading force is required to ensure contact is maintained between a brush and power strip, particularly over time as the brush wears. In contrast, with a brush and wheel, there are no irregularities in the point of contact between the brush and wheel. As a result, the spring force used to maintain contact between the brush and wheel can be reduced, thereby reducing the drive force or power necessary to move the robotic device.

Still further, the brush and wheel embodiment also reduces track wear, since the rolling friction between the wheel and track creates less wear than the sliding friction between a brush and power strip. In that regard, the conductive strips in a brush and power strip embodiment must be made sufficiently thick to allow for wear due to brush contact over time. Moreover, as previously noted, spring loading forces for brushes in a brush and power strip embodiment must be sufficiently high to ensure contact is maintained between the brush and power strip over time as both wear. A brush and wheel embodiment eliminates these concerns and allows for the use of a more inexpensive track having less stringent design and assembly tolerances.

In either of the brush and power strip or brush and wheel embodiments, the power strip or conduction rails may be oriented horizontally, as shown in the Figures, or vertically, or in a combination of both. Indeed, a vertical track orientation may be preferred, particularly for curved track areas. In that regard, for example, an extended printed circuit board power strip of the type previously described can be easily bent to follow a curved track area if such a power strip is provided with a vertical orientation. In contrast, to follow a curved track with a such a power strip oriented horizontally, a curved printed circuit board may need to be specially manufactured. Moreover, as the radius of curvature of a curved track area decreases, skidding and wear of wheels increases on a horizontally oriented track. This can be alleviated by a vertically oriented track.

Again in either embodiment, the power conductors or strips may be provided in segments or sections that can be electrically connected together in a modular fashion, thereby extending the power conductors or strip substantially throughout a data storage library. Such sections may be joined together along the path or a guide rail on which a robotic device moves in the library. In that regard, it should be noted that in either embodiment, the segments or sections of power conductors or strips may be connected in an end to end fashion to provide for robotic device movement in a single dimension, or may be connected in a grid-like fashion to provide for robotic device movement in two dimensions and/or to provide power across multiple horizontal paths for robotic devices, which paths may be stacked vertically on top of each other, thereby providing for robotic device access to multiple media cartridge storage cells arranged in a two dimensional configuration of multiple rows and columns, such as a planar "wall" or "floor," or a curved or substantially cylindrical "wall." Still further, again in either embodiment, the segments or sections of power conductors or strips may be connected in such a fashion as to provide for robotic device movement in three dimensions.

When used in such fashions for power distribution, segmented power strips will be sensitive to alignment so as not to create a sloppy joint. A mis-aligned joint in the power strip may cause a brush to lose contact with a power strip due to bounce. Wear on the brushes and power strip pieces at the joints may also cause limited life of the joint.

As a result, according to the present invention, a joint for such power strips is pre-loaded and overconstrained to cause the power strips in the robot guide rail to substantially align. Such a joint preferably includes conductors slightly longer than the supporting structure of the robot guide rail, so as to force adjoining conductors into contact at their ends as guide rails and conductors are assembled. In addition, adjoining ends of conductors are preferably beveled or angled such that a force urging the conductors together causes the conductors to slip laterally against each other, so as to again facilitate alignment at the joint. Such a bevel or angle also spreads out the wiping action of a brush as it traverses the joint, thereby prolonging the life of the joint and brush, and limiting any problems that may arise as a result of any small offset. Still further, the power strips are preferably pre-loaded or biased by a spring load, thereby causing the joint to stay in compression for the life of the joint.

Referring next to FIGS. 9 through 12*a–g*, various perspective, cross-sectional and side views of a power strip and guide rail for use in an automated tape cartridge library according to the present invention are shown. As previously described, power strip sections in a brush and power strip embodiment may be sensitive to alignment. As seen in FIGS. 9–12*g*, guide rail sections (2A, 2B) are designed to accept substantially planar, elongated power strip sections (1A, 1B). In that regard, power strip sections (1A, 1B) are preferably of the printed circuit board type previously described, and preferably include upper (56) and lower (not shown) copper conductive layers on opposite surfaces of an FR4 type substrate material (58). Track alignment pins (50) and holes (52) in guide rail sections (2A, 2B) ensure that guide rails sections (2A, 2B) are properly aligned at the joint, and a joint bolt (54) is provided to ensure sufficient force to maintain the joint. In that regard, an alternative latch mechanism (55) is depicted in FIGS. 11*a* and 11*b* to provide sufficient force to maintain the joint.

Power strips (1A, 1B) are preferably beveled or angled (preferably at 30°) in a complimentary fashion at adjoining ends (57, 59) so that such ends (57, 59) will move or slide laterally relative to each other in the X-Y plane during assembly of the joint, thereby accounting for varying tolerances in the lengths of adjoining power strips (1A, 1B) and/or guide rails (2A, 2B). In that same regard, power strips (1A, 1B) are preferably each provided with spring arms (60), which act as means for biasing power strips (1A, 1B) together against such lateral motion. Spring arms (60) preferably include mounting pin holes (62) formed therein, which are designed to align with similar mounting pin holes (64) formed in guide rails (2A, 2B) for receipt of mounting pins (66). Such a configuration facilitates the previously described relative lateral motion between power strips (1A, 1B) in the X-Y plane during assembly, and helps to ensure that power strips (1A, 1B) remain in contact after assembly. A similar spring arm, mounting pin hole and mounting pin arrangement (67) is preferably provided in a central region of each power strip (1) and guide rail (2) section (see FIG. 12*e*).

Power strips (1A, 1B) are also preferably provided at their adjoining ends (57, 59) complimentary tongue-and-groove like or dove tail type mating edges or surfaces (68, 70). Such edges (68, 70), preferably formed with 45° angles, ensure that power strips (1A, 1B) remain co-planer at the joint (i.e., refrain from movement relative to each other in the Z direction) so as not to expose an edge of an upper (56) or lower (not shown) conductive layer. Electrical connection is provided at the joint through the use of quick connect electrical slide type connectors (3A, 3B). In that regard, upper (56) and lower (not shown) conductive layers of adjoining power strips (1A, 1B) each preferably include an electrical connection point or tab (72). Upon assembly of power strips (1A, 1B), such electrical connection points (72) are proximate each other such that one connector (3A) creates an electrical connection between upper conductive layers (56) of adjoining power strips (1A, 1B), while the other connector (3B) creates an electrical connection between lower conductive layers (not shown) of adjoining power strips (1A, 1B).

In such a fashion, power strips (1A, 1B) are assembled to create a joint where their respective conductive layers are proximate such that a robotic device having brush or wiper type contacts as previously described maintains electrical contact therewith as the robotic device traverses the joint. A well aligned power strip and guide rail joint is thus provided which facilitates easy movement of a brush or wiper contact thereacross, while at the same time accounting for differing manufacturing tolerances and expansion rates between the dissimilar materials used in the power strips (1) and guide rails (2). It should also be noted that while depicted in the figures in conjunction with printed circuit type power strips (1), such features may be used with any type of power strip (1) previously described, or with any other type of joint for power conductors, such as a single conductive strip or bus bar. Indeed, many of the above features may also be used with any type of joint, such as between guide rails without power.

Figure 13:
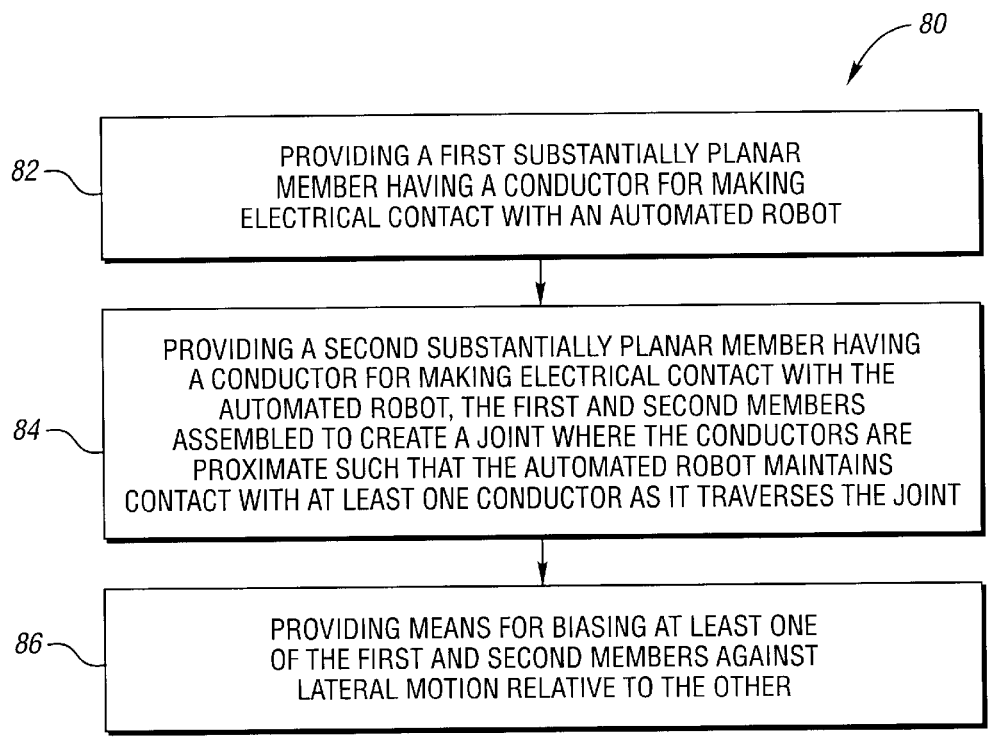
FIG. 13 is a simplified, exemplary flowchart depicting one embodiment of the method of the present invention.

Referring now to FIG. 13, a simplified, exemplary flowchart of one embodiment of the method of the present invention is shown, denoted generally by reference numeral 80. The method (80) is provided for joining a segmented power strip for supplying electrical power to an automated robotic device for use in a data storage system having a guide rail, wherein the automated robotic device adapted to move along the guide rail. As seen in FIG. 13, the method (80) comprises providing (82) a first substantially planar member having an end, the first member comprising a conductor for making electrical contact with the automated robotic device. The method (80) further comprises providing (84) a second substantially planar member having an end, the second member comprising a conductor for making electrical contact with the automated robotic device, wherein the first and second members are assembled to create a joint where the conductor of the first member is proximate the conductor of the second member such that the automated robotic device maintains electrical contact with at least one conductor as the automated robotic device traverses the joint, and wherein the ends of the first and second members are adapted to cooperate such that the at least one of the first and second members moves laterally relative to the other of the first and second members during assembly thereof. The method (80) still further comprises providing (86) means for biasing at least one of the first and second members against lateral motion relative to the other of the first and second members.

Figure 14:
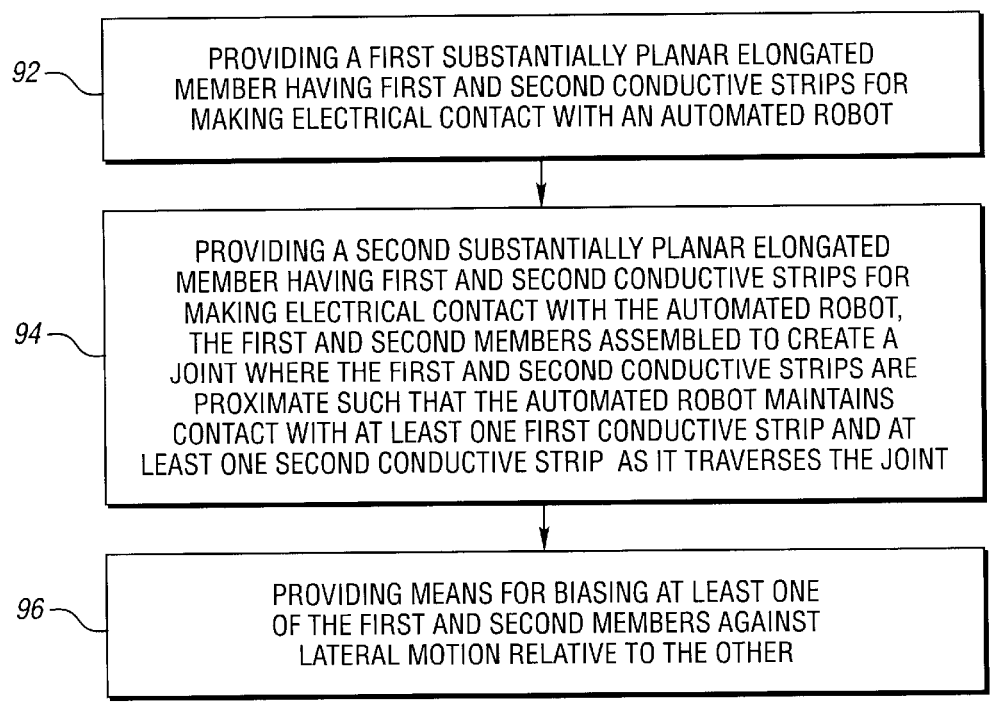
FIG. 14 is a simplified, exemplary flowchart depicting another embodiment of the method of the present invention.

Referring next to FIG. 14, a simplified, exemplary flowchart of another embodiment of the method of the present invention is shown, denoted generally by reference numeral 90. The method (90) is provided for joining a segmented power strip for supplying electrical power to an automated robotic device for use in a data storage system having a guide rail, wherein the automated robotic device adapted to move along the guide rail. As seen in FIG. 14, the method (90) comprises providing (92) a first substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip.

The method (90) also comprises providing (94) a second substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip, wherein the first and second members are assembled to create a joint where the first and second conductive strips of the first member are proximate the first and second conductive strips of the second member, respectively, such that the automated robotic device maintains electrical contact with at least one first conductive strip and at least one second conductive strip as the automated robotic device traverses the joint, and wherein the ends of the first and second members are adapted to cooperate such that at least one of the first and second members moves laterally relative to the other of the first and second members during assembly thereof. The method still further comprises providing (96) means for biasing at least one of the first and second members against lateral motion relative to the other of the first and second members.

It should be noted that the simplified flowcharts depicted in FIGS. 13 and 14 are exemplary of the method of the present invention. In that regard, the steps of such method may be executed in sequences other than those shown in FIGS. 13 and 14, including the execution of one or more steps simultaneously.

Thus it is apparent that the present invention provides for improved power distribution to an automated robotic device in a data storage library using a segmented power strip. In that regard, the present invention includes a pre-loaded and overconstrained joint which causes the power strips in the robot guide rail to substantially align. The present invention also includes conductors slightly longer than the supporting structure of the robot guide rail, so as to force adjoining conductors into contact at their ends as guide rails and conductors are assembled. In addition, adjoining ends of conductors are beveled or angled such that a force urging the conductors together causes the conductors to slip laterally against each other, so as to again facilitating alignment at the joint. Such a bevel or angle also spread out the wiping action of a brush as it traverses the joint, thereby prolonging the life of the joint and brush, and limiting any problems that may arise as a result of any small offset. Still further, the power are pre-loaded or biased by a spring load, thereby causing the joint to stay in compression for the life of the joint.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a data storage system having an automated robotic device and a guide rail, the automated robotic device adapted to move along the guide rail, a segmented power strip for supplying electrical power to the automated robotic device, the segmented power strip comprising:

a first substantially planar member having an end, the first member comprising a conductor for making electrical contact with the automated robotic device;

a second substantially planar member having an end, the second member comprising a conductor for making electrical contact with the automated robotic device, wherein the first and second members are assembled to create a joint where the conductor of the first member is proximate the conductor of the second member such that the automated robotic device maintains electrical contact with at least one conductor as the automated robotic device traverses the joint, and wherein the ends of the first and second members are adapted to cooperate such that at least one of the first and second members moves laterally relative to the other of the first and second members during assembly thereof; and means for biasing at least one of the first and second members against lateral motion relative to the other of the first and second members.

2. The power strip of claim 1 wherein the ends of the first and second substantially planar members comprise cooperating mating surfaces so that the first and second members are substantially co-planar.

3. The power strip of claim 1 wherein the means for biasing at least one of the first and second members against lateral motion relative to the other of the first and second members comprises a spring arm connected to the first member biasing the first member such that the ends of the first and second members maintain contact.

4. The power strip of claim 1 wherein the ends of the first and second members are angled to facilitate lateral motion of at least one of the first and second members relative to the other of the first and second members during assembly thereof.

5. The power strip of claim 1 wherein the first and second substantially planar members each comprise an insulating material having a conductive strip thereon.

6. The power strip of claim 1 wherein the conductors of the first and second substantially planar members each comprise an electrical connection point, the electrical connection point of the first conductor is proximate the electrical connection point of the second conductor upon assembly of the first and second members, and the electrical connection points are connected by an electrical connector.

7. The power strip of claim 1 wherein the first and second substantially planar members and the guide rail each have mounting pin holes formed therein, the mounting pin holes cooperating and adapted to receive mounting pins for use in securing the first and second substantially planar members to the guide rail.

8. In a data storage system having an automated robotic device and a guide rail, the automated robotic device adapted to move along the guide rail, a segmented power strip for supplying electrical power to the automated robotic device, the segmented power strip comprising:

a first substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip;

a second substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip, wherein the first and second members are assembled to create a joint where the first and second conductive strips of the first member are proximate the first and second conductive strips of the second member, respectively, such that the automated robotic device maintains electrical contact with at least one first conductive strip and at least one second conductive strip as the automated robotic device traverses the joint, and wherein the ends of the first and second members are adapted to cooperate such that at least one of the first and second members moves laterally relative to the other of the first and second members during assembly thereof; and means for biasing at least one of the first and second members against lateral motion relative to the other of the first and second members.

9. The power strip of claim 8 wherein the ends of the first and second substantially planar members comprise cooperating mating surfaces so that the first and second members are substantially co-planar.

10. The power strip of claim 8 wherein the means for biasing at least one of the first and second members against lateral motion relative to the other of the first and second members comprises a first spring arm connected to the first member and a second spring arm connected to the second member, the first and second spring arms biasing the first and second members such that the ends of the first and second members maintain contact.

11. The power strip of claim 8 wherein the ends of the first and second members are angled to facilitate lateral motion of at least one of the first and second members relative to the other of the first and second members during assembly thereof.

12. The power strip of claim 8 wherein the first and second substantially planar members each comprise an insulating material having the conductive strips formed thereon.

13. The power strip of claim 8 wherein the first and second conductive strips of the first and second substantially planar members each comprise an electrical connection point, the electrical connection points of the first conductive strips are proximate each other and the electrical connection points of the second conductive strips are proximate each other upon assembly of the first and second members, and the electrical connection points of the first conductive strips are connected by a first electrical connector and the electrical connection points of the second conductive strips are connected by a second electrical connector.

14. The power strip of claim 8 wherein the first and second substantially planar members and the guide rail each have mounting pin holes formed therein, the mounting pin holes cooperating and adapted to receive mounting pins for use in securing the first and second substantially planar members to the guide rail.

15. In a data storage system having an automated robotic device and a guide rail, the automated robotic device adapted to move along the guide rail, a method for joining a segmented power strip for supplying electrical power to the automated robotic device, the method comprising:

providing a first substantially planar member having an end, the first member comprising a conductor for making electrical contact with the automated robotic device;

providing a second substantially planar member having an end, the second member comprising a conductor for making electrical contact with the automated robotic device, wherein the first and second members are assembled to create a joint where the conductor of the first member is proximate the conductor of the second member such that the automated robotic device maintains electrical contact with at least one conductor as the automated robotic device traverses the joint, and wherein the ends of the first and second members are adapted to cooperate such that the at least one of the first and second members moves laterally relative to the other of the first and second members during assembly thereof; and providing means for biasing at least one of the first and second members against lateral motion relative to the other of the first and second members.

16. The method of claim 15 wherein the ends of the first and second substantially planar elongated members comprise cooperating mating surfaces so that the first and second members are substantially co-planar.

17. The method of claim 15 wherein the means for biasing at least one of the first and second members against lateral motion relative to the other of the first and second members comprises a spring arm connected to the first member biasing the first member in a direction such that the ends of the first and second members maintain contact.

18. The method of claim 15 wherein the ends of the first and second members are angled to facilitate lateral motion of at least one of the first and second members relative to the other of the first and second members during assembly thereof.

19. The method of claim 15 wherein the first and second substantially planar elongated members each comprise an insulating material having a conductive strip thereon.

20. The method of claim 15 wherein the conductors of the first and second substantially planar elongated members each comprise an electrical connection point, the electrical connection point of the first conductor is proximate the electrical connection point of the second conductor upon assembly of the first and second members, and the electrical connection points are connected by an electrical connector.

21. The method of claim 15 wherein the first and second substantially planar elongated members and the guide rail each have mounting pin holes formed therein, the mounting pin holes cooperating and adapted to receive mounting pins for use in securing the first and second substantially elongated members to the guide rail.

22. In a data storage system having an automated robotic device and a guide rail, the automated robotic device adapted to move along the guide rail, a method for joining a segmented power strip for supplying electrical power to the automated robotic device, the method comprising:

providing a first substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip;

providing a second substantially planar elongated member having first and second sides and an end, the first side having a first electrically conductive strip thereon for making electrical contact with the automated robotic device, the first conductive strip having an electrical charge, the second side having a second electrically conductive strip thereon for making contact with the automated robotic device, the second conductive strip having an electrical charge opposite the electrical charge of the first conductive strip, wherein the first and second members are assembled to create a joint where the first and second conductive strips of the first member are proximate the first and second conductive strips of the second member, respectively, such that the automated robotic device maintains electrical contact with at least one first conductive strip and at least one second conductive strip as the automated robotic device traverses the joint, and wherein the ends of the first and second members are adapted to cooperate such that at least one of the first and second members moves laterally relative to the other of the first and second members during assembly thereof; and providing means for biasing at least one of the first and second members against lateral motion relative to the other of the first and second members.

23. The method of claim 22 wherein the ends of the first and second substantially planar elongated members comprise cooperating mating surfaces so that the first and second members are substantially co-planar.

24. The method of claim 22 wherein the means for biasing at least one of the first and second members against lateral motion relative to the other of the first and second members comprises a first spring arm connected to the first member and a second spring arm connected to the second member, the first and second spring arms biasing the first and second members such that the ends of the first and second members maintains contact.

25. The method of claim 22 wherein the ends of the first and second members are angled to facilitate lateral motion of at least one of the first and second members relative to the other of the first and second members during assembly thereof.

26. The method of claim 22 wherein the first and second substantially planar elongated members each comprise an insulating material having the conductive strips formed thereon.

27. The method of claim 22 wherein the first and second conductive strips of the first and second substantially planar elongated members each comprise an electrical connection point, the electrical connection points of the first conductive strips are proximate each other and the electrical connection points of the second conductive strips are proximate each other upon assembly of the first and second members, and the electrical connection points of the first conductive strips are connected by a first electrical connector and the electrical connection points of the second conductive strips are connected by a second electrical connector.

28. The method of claim 22 wherein the first and second substantially planar elongated members and the guide rail each have mounting pin holes formed therein, the mounting pin holes cooperating and adapted to receive mounting pins for use in securing the first and second substantially elongated members to the guide rail.

* * * * *